United States Patent [19]

Whiting

[11] Patent Number: 4,630,990
[45] Date of Patent: Dec. 23, 1986

[54] DEVICE AND METHOD FOR LOADING AND TRANSPORTING ELONGATE OBJECTS ON THE TOPS OF VEHICLES

[76] Inventor: Montague, Whiting, Box 6109 SFA, Nacogdoches, Tex. 75962

[21] Appl. No.: 772,154

[22] Filed: Sep. 3, 1985

[51] Int. Cl.⁴ .............................................. B60P 3/10
[52] U.S. Cl. ........................... 414/462; 224/42.03 R; 224/310; 224/324; 410/96; 410/101; 414/533
[58] Field of Search ............... 414/462, 533, 543, 786; 224/42.03 R, 42.03 B, 310, 322, 323, 324; 410/2, 80, 81, 91, 96, 101, 108, 109, 110

[56] References Cited

U.S. PATENT DOCUMENTS

| | | | |
|---|---|---|---|
| 78,566 | 6/1868 | Barker | 414/540 |
| 1,208,667 | 12/1916 | Sammel | 410/2 |
| 2,464,979 | 3/1949 | Hyatt | 224/310 X |
| 2,772,799 | 12/1956 | Bridinger | 414/462 |
| 2,782,972 | 2/1957 | Binding | 224/322 |
| 2,785,816 | 3/1957 | Fisher | 414/462 |
| 3,885,689 | 5/1975 | Grove et al. | 414/462 |
| 3,917,094 | 11/1975 | Magneson | 414/462 |
| 4,046,273 | 9/1977 | Hughes | 414/462 |
| 4,298,151 | 11/1981 | O'Connor | 224/42.03 B |

Primary Examiner—Leslie J. Paperner
Attorney, Agent, or Firm—William E. Shull; David A. Rose; Murray Robinson

[57] ABSTRACT

A device for loading and transporting elongate objects on vehicle roof-tops. A lower tubular member connected to a vehicle in an upright position and further stabilized by a support disposed between the vehicle and the lower tubular member rotatably receives an upper vertical member so that these members are aligned coaxially. A horizontal load bearing member attached substantially at its midpoint to the upper end of the upper vertical member includes rollers which allow elongate objects to be rolled onto the horizontal load bearing member. A supporting pin is placed through the lower tubular member in one pair of a plurality of pairs of holes located at 180-degree spacing for supporting the upper vertical member and allowing height adjustment of the device. Eyebolts are secured at each end of the horizontal load bearing member in one pair of a plurality of pairs of holes to provide adjustable tie down points for the elongate objects.

10 Claims, 18 Drawing Figures

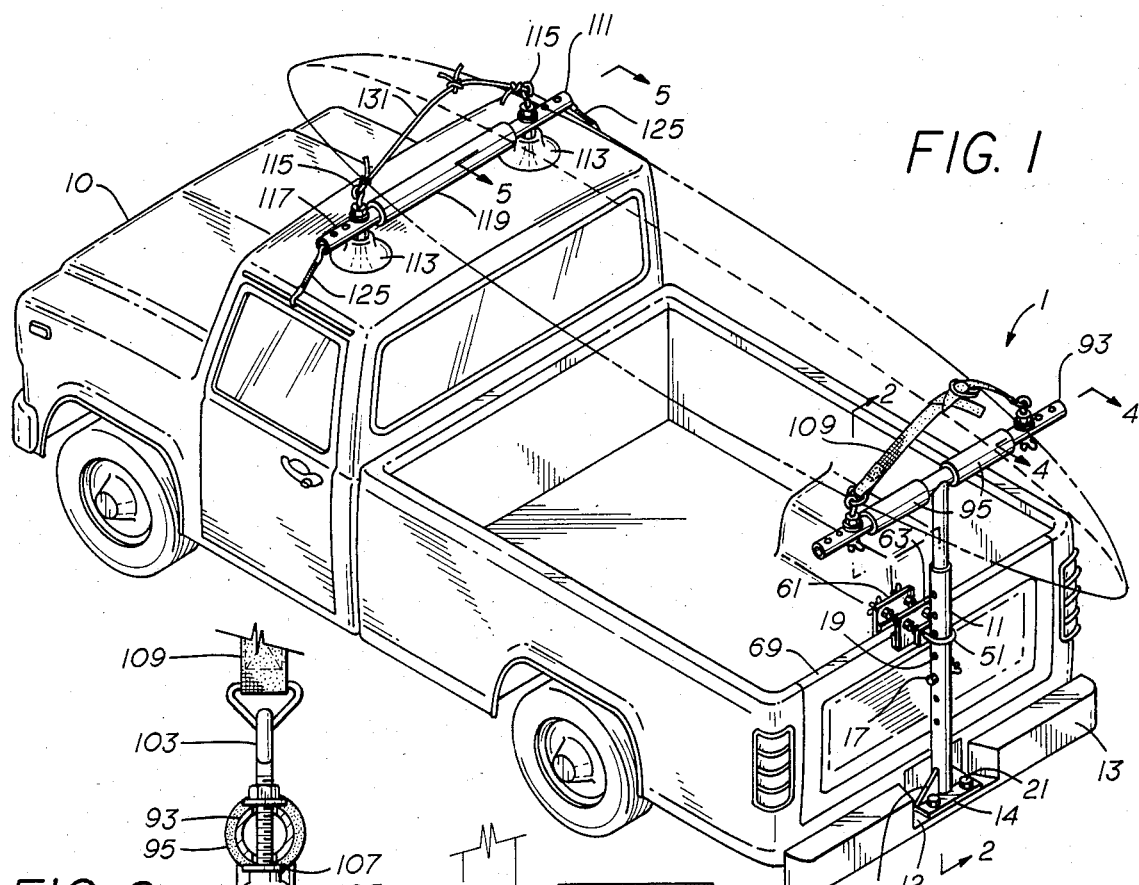

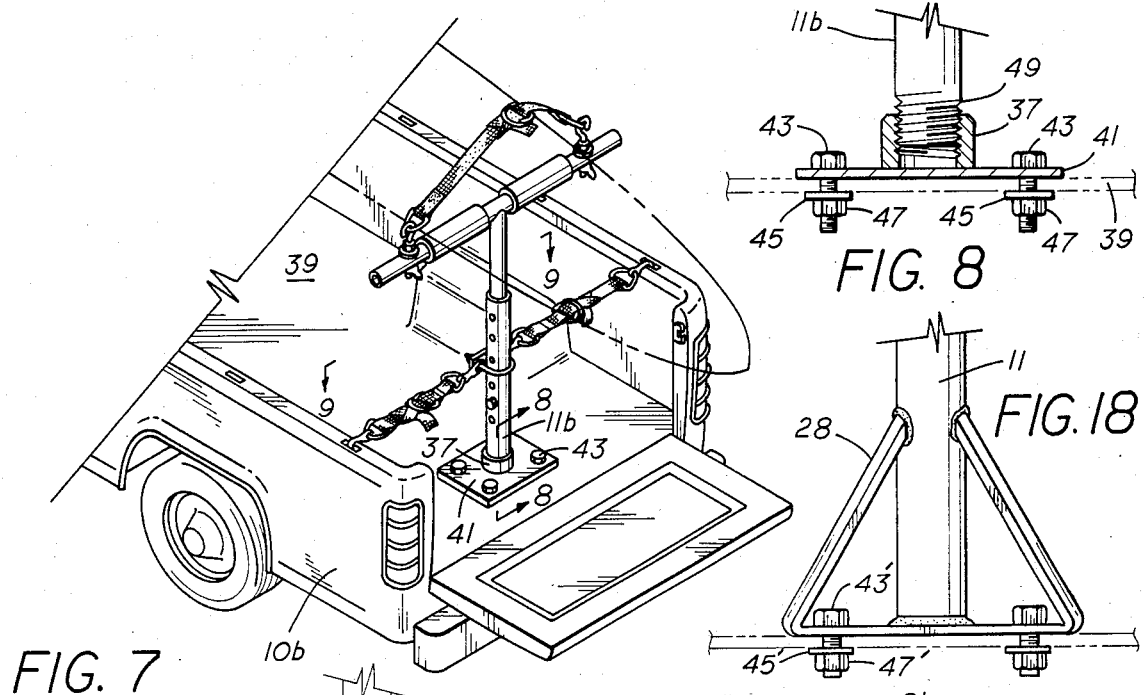
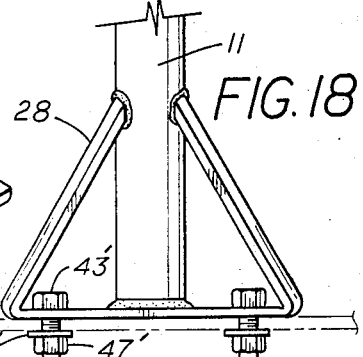
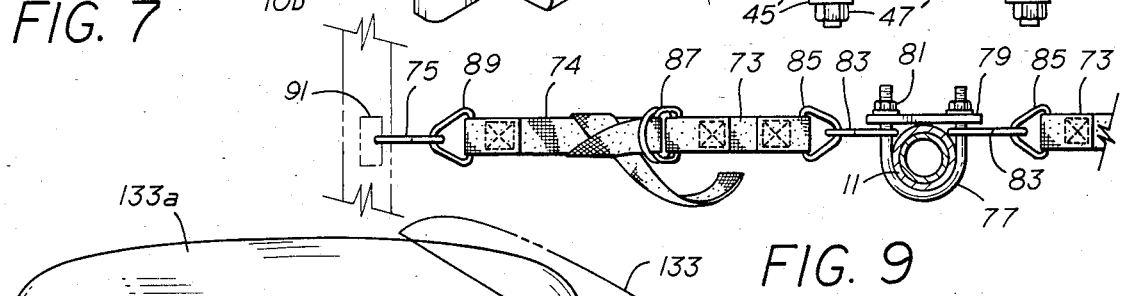
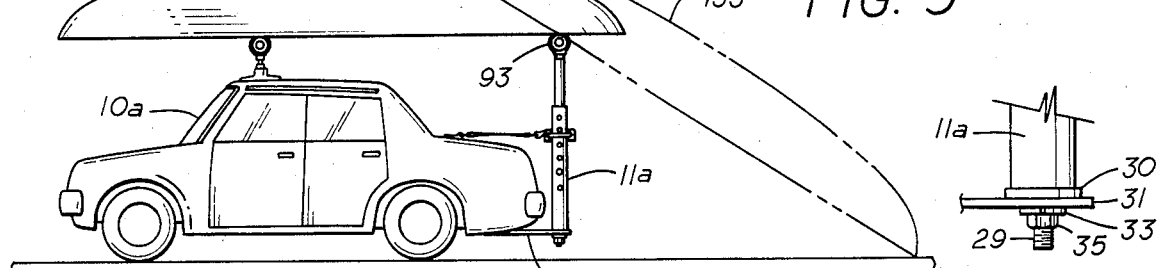
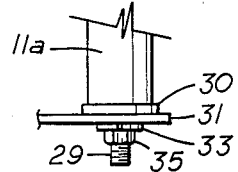
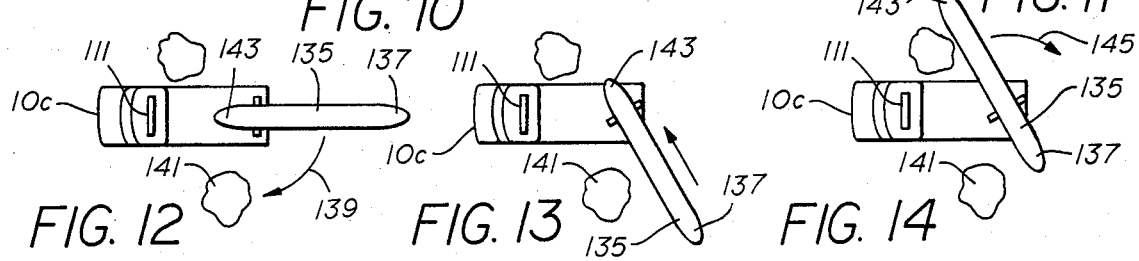
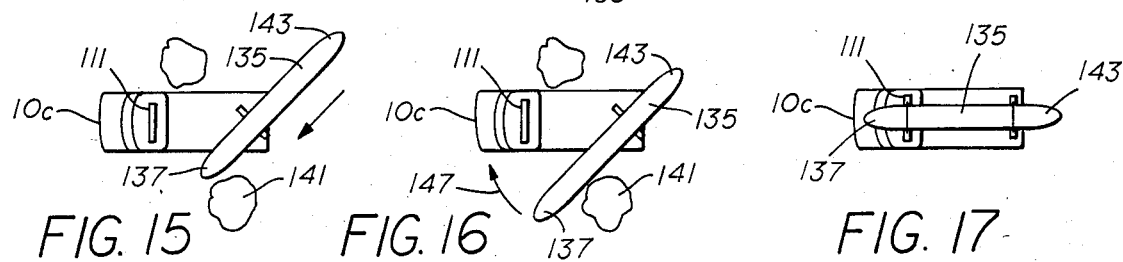

DEVICE AND METHOD FOR LOADING AND TRANSPORTING ELONGATE OBJECTS ON THE TOPS OF VEHICLES

BACKGROUND OF THE INVENTION

The present invention relates generally to a device and method used in loading and transporting lengthy, bulky, or heavy objects on vehicle rooftops or the like, and more particularly to a device and method which allow a single person to load such objects onto the top of a motor vehicle where, without this device, it would otherwise require the assistance of a second person.

In the past, loading and carrying relatively long, heavy, or bulky objects on the top of a car or truck usually required a minimum of two individuals to lift the object and to position it on a rooftop carrier mounted on the car or truck top while supporting the entire weight of the object at the same time. An item such as a canoe or a ladder would typically be lifted by two individuals, one at each end of the load. Prior methods of loading such long, heavy, and bulky objects onto rooftop carriers placed each individual loading the object in a stressful position, as such a person was required to lift a heavy load and, at the same time, to extend the load away from his body in order to position the load on the rooftop carrier. Sometimes, such loads would be transported in the bed of a truck, frequently resulting in a substantial length of the object extending beyond the bed of the truck. While it was physically easier to load such an object in the bed of a truck, it still generally required the efforts of two persons. Also, it is undesirable to have a portion of a long load extending beyond the bed of a truck, where it is exposed to damage from collision, presents a safety hazard for other vehicles, and is susceptible to damage from bouncing in the bed or sliding out of the bed.

The usual requirement of having a second individual assist in loading an object was the major disadvantage of prior devices and methods for loading and carrying lengthy, bulky and heavy loads. If, for example, one wished to transport an object, such as a canoe, which he ultimately would use by himself, he nevertheless typically required the assistance of another person to both load and unload the canoe.

Applicant believes that a device has been marketed by Sears, Roebuck and Company which facilitated the loading and unloading of flat transomed boats onto car tops and possibly truck tops. Applicant believes that such a device consisted of a vertical member which was attached to the trailer hitch of a car to which the flat transom of a boat, such as a rowboat, was clamped. It is believed that this device supported the stern of the boat while one individual lifted the bow, swung the bow around, and positioned the boat on a pair of standard car top carriers. Applicant believes that this device could not accommodate canoes, ladders, pipes, lumber or other similar loads which Applicant's device is designed to carry, as such loads do not have a flat end suitable for being clamped to the Sears device.

SUMMARY OF THE INVENTION

The present invention provides a device and method for loading, transporting, and unloading relatively long, heavy, or bulky objects on a car or truck top which allow the loading and unloading to be accomplished by one person.

The device includes an upper vertical member, which is either tubular or cylindrical in cross section, and a lower vertical tubular member. The lower vertical tubular member has its lower end fixed to the trailer hitch or bumper of a passenger car or truck, or alternatively, to the bed of a pickup truck, while its upper end rotatably receives the lower end of the upper vertical member so that the two vertical members are aligned coaxially. The lower end of the upper vertical member rests upon a supporting pin which is secured in one of a number of holes drilled transversely through the lower vertical tubular member which provide for the vertical height adjustment of the upper vertical member. While the supporting means for this device has been described as an upper vertical member which is rotatably received within a lower vertical tubular member, an equivalent supporting means comprises a lower vertical member of tubular or cylindrical cross section which is rotatably received by an upper tubular vertical member provided with a number of transverse holes, through one of which a supporting pin is secured. In either case, a horizontal member, preferably padded to cushion the load, is attached to the upper end of the upper vertical member so that the two members are fixed perpendicularly to one another and form a T-shaped rigid structure. With the horizontal member attached to the upper vertical member, and with the upper vertical member positioned coaxially within the lower vertical tubular member, the resulting T-shaped structure may freely rotate within the lower vertical tubular member while being supported by the supporting pin. This enables a single person to load a lengthy and quite heavy object by first placing one end of the object, such as a canoe or ladder, on the horizontal member, then lifting the opposite end of the load and carrying it in an arcuate path from behind the vehicle to its position on a rooftop carrier or the like while, at the same time, the T-shaped structure rotates 180° about the axis of the vertical members. With the load thusly positioned, with one end resting on the rooftop carrier or the like and the other end resting on the horizontal member, conventional tie down means can be used to secure the load on the rooftop carrier and the horizontal member, with the latter having an eyebolt installed in each of its end portions in one of a plurality of holes drilled transversely through the end portions of the horizontal member and parallel to the axis of the vertical member which allow the device to accommodate loads of various widths. When it is desirable to remove the load, the tie down means can be removed and the rotational process reversed, whereby the frontmost end of the load is removed from the car top carrier and carried in an arcuate path to the rear of the vehicle, where this end is then lowered to the ground. The other end of the load, still resting on the horizontal member, can then be lifted by a single individual and placed on the ground. In order to facilitate loading of a heavy object, the upper vertical member may be placed in a lower initial position, prior to placing the end of the object on the horizontal member. The end of the object will then not have to be lifted as high as it would have to be lifted if the upper vertical member were in an upper position such as would be used in transporting the object. After placing the other end of the object on the carrier at the front of the vehicle, the upper vertical member may be raised into such upper position for transporting. It will be appreciated that the reverse procedure may be followed in order to facilitate unloading the heavy object. That is, the upper vertical member may be lowered, the end of the object at the front of the vehicle lifted and swung around to the back of the vehicle, and the end of the object on the horizontal member lifted from the lowered position to the ground.

Applicant's invention may be mounted on a vehicle by various means. A threaded stud may be fixed to the lower end of the lower vertical tubular member which may then be positioned in a hole in the towing platform in a bumper or in the bed of the vehicle, or in the hole provided for a towing ball in a trailer hitch. Reinforcement may be provided by struts or the like between the upper vertical member and the bumper or trailer hitch, or vehicle bed. To provide additional support, a clamping device may be used to clamp the lower vertical tubular member to the trunk of a car or a tailgate of a truck, or alternatively, the lower vertical tubular member may be bolted to the truck or tailgate through corresponding holes drilled through the lower vertical tubular member and the truck or tailgate. As alternative means to mount the lower vertical tubular member on a truck, a baseplate may be attached to the lower vertical tubular member with the baseplate then bolted to the towing platform in the truck's bumper, or an upwardly extending coupling may be attached to the bed of the truck into which the lower end of the lower vertical tubular member is secured. When this latter means is used, the additional support for the lower vertical tubular member is provided by straps which are fastened to the lower vertical tubular member and secured to the truck body.

As stated previously, Applicant believes that the device marketed by Sears, Roebuck and Company was unsuitable for loading and carrying any load other than a flat transomed boat. The present invention is an improvement over any such prior art device, not only because it can be used to load and carry items which do not have a flat transom, but also because one embodiment of this invention allows the load to be rolled in a direction perpendicular to the axis of the horizontal member as the load is being pivoted in its arcuate path in order to shorten the radius of the arc and thereby allow the load to swing past obstacles which may be positioned so as to impede the pivoting of the load at its full radius. This is accomplished by positioning rollers on the horizontal member. It is believed that these rollers, which also may be padded so as to dampen vibration and prevent damage to the load during both loading and transporting, were not present on the device marketed by Sears, Roebuck and Company.

As mentioned above, the lower vertical tubular member of this invention can be mounted in the bed of the truck instead of on the bumper or trailer hitch, thus allowing the tailgate of the truck to be swung open without first removing the device. This embodiment facilitates the loading and unloading of other equipment and items from the truck, without necessitating the removal of both the load and this invention. It is believed that the prior device marketed by Sears, Roebuck and Company had to be mounted on a trailer hitch, thus not allowing the lowering or opening of a truck's tailgate or car's trunk without first removing the device and the load it carries.

Applicant's invention further contemplates the loading and carrying of two loads simultaneously. This is accomplished by providing a horizontal member of such length so as to accommodate the width of the two objects which are to be transported. When utilizing this invention to perform this task, the first object may be loaded in the manner described for a single load above, with the second object then being loaded in the conventional manner requiring two individuals to lift and position the second object adjacent and parallel to the first load. Alternatively, when the objects are light enough to allow it, the two objects may be loaded simultaneously. To do so requires that the two objects be first positioned adjacent and parallel to one another, with one end of each object positioned on the horizontal member and the other end of each object remaining on the ground behind the vehicle. In this position, a rod, board, paddle or any other available lifting means may be placed beneath the ends of the objects which are remaining on the ground and used to lift these two ends simultaneously, and used further to carry and pivot these ends in an arcuate path in the manner described above, and used ultimately to lower the objects onto the rooftop carrier or the like. It is believed that the device marketed by Sears, Roebuck and Company could not be used in this manner to carry two objects simultaneously. Moreover, it is believed that the device marketed by Sears, Roebuck and Company could not be used in the manner discussed above for facilitating loading and unloading heavy objects, i.e., lowering the upper vertical member prior to loading and unloading the end of the objects which rest upon the horizontal member.

BRIEF DESCRIPTION OF THE DRAWINGS

FIG. 1 is an isometric view of one embodiment of the device of the present invention illustrating the device as mounted on the towing portion of a rear bumper of a truck.

FIG. 2 is a vertical sectional view, partly in elevation, of the embodiment of the present invention shown in FIG. 1, taken along lines 2—2 of FIG. 1.

FIG. 3 is a horizontal sectional view, partly in elevation, of the embodiment of the present invention shown in FIG. 1, taken along lines 3—3 of FIG. 2.

FIG. 4 is a partial vertical sectional view, partly in elevation, of the embodiment of the invention shown in FIG. 1, taken along lines 4—4 of FIG. 1.

FIG. 5 is a partial vertical sectional view, partly in elevation and taken along lines 5—5 of FIG. 1, of a rooftop carrier which may be used with the present invention to support one end of the load, the other end of which is supported by the invention.

FIG. 6 is a view similar to FIG. 4, illustrating the use of rollers on the upper horizontal member instead of the padding shown in FIG. 4.

FIG. 7 is a partial isometric view of an alternative embodiment of the device of the present invention, illustrating the device as mounted on the bed of a truck.

FIG. 8 is a partial vertical sectional view, partly in elevation, of the embodiment of the invention shown in FIG. 7, taken along lines 8—8 of FIG. 7.

FIG. 9 is a partial horizontal sectional view, partly in elevation, of the embodiment of the invention shown in FIG. 7, taken along lines 9—9 of FIG. 7.

FIG. 10 is a side elevational view of another alternative embodiment of the device of the present invention, illustrating the device as mounted on a trailer hitch or the like of an automobile.

FIG. 11 is a partial, side elevational view of the embodiment of the invention shown in FIG. 10, illustrating in enlarged fashion the lower end of the lower vertical member as mounted to the trailer hitch or on the towing platform of a pickup.

FIGS. 12-17 are schematic plan views illustrating the carrying out of one embodiment of the method of the present invention where obstacles to be avoided are located on each side of the truck on which the device of the present invention is mounted. These figures show the load in various positions as it is pivoted in an arcuate path from its initial position to its final position for transportation. These views also show how the load may be rolled on the rollers of the horizontal member in order to clear the obstacles.

FIG. 18 is a partial, side elevational view showing alternative reinforcing means for the mounting apparatus for the lower vertical member.

DETAILED DESCRIPTION OF THE PREFERRED EMBODIMENTS

Referring to FIG. 1, there is shown one embodiment of the device of the present invention, indicated generally at 1. A lower vertical tubular member 11 of the carrier 1 is mounted to the towing platform 12 formed in the rear bumper 13 of a vehicle 10. The lower vertical tubular member rotatably receives an upper vertical member 15 to a depth allowed by a supporting pin 17 which is positioned transversely through the lower vertical tubular member in one of a plurality of pairs of holes 19 which are located at 180° spacing on opposite sides of the lower vertical tubular member 11 to allow for vertical height adjustment. The lower vertical tubular member 11 is shown attached to the towing platform 12 of the rear bumper 13 in FIG. 1 by means of a baseplate 14 which is fixed to the lower vertical tubular member 11, such as by welding, and which is then secured to the towing platform by bolts 21, locking washers 23, and nuts 25 (see FIG. 2). Still referring to FIG. 1, there are shown supporting fins 27 which may be welded or otherwise fixed between the base plate 14 and the lower vertical tubular member 11. Fins 27 provide for increased support and stability of the lower tubular member.

Referring to FIG. 11, there is shown an alternative means for securing the lower vertical tubular member 11a to a vehicle 10a by means of a threaded stud 29 which is coaxially attached to a plate 30 on the end of lower vertical tubular member 11a and inserted through a hole in a trailer hitch 31 otherwise provided for a towing ball. In this manner, the lower vertical tubular member 11a is rigidly fixed to the hitch 31 by means of the threaded stud 29, locking washer 33 and securing nut 35. This alternative attaching means can also be used for attaching the lower vertical member to the towing platform 12 shown in FIG. 1. In that event, stud 29 would be inserted in the center hole of the typically three-holed configuration commonly found in such towing platforms. The presence of the two additional holes commonly found in such towing platforms facilitates providing an alternative reinforcing means to fins 27. As shown in FIG. 18, struts 28 may be bolted to towing platform 12 of vehicle 10 (see FIG. 1) on opposite sides of lower vertical member 11. Bolts 43', washers 45', and nuts 47' secure struts 28 to the two holes on either side of the center hole in platform 12 through which threaded stud 29 extends (FIG. 11). The upper ends of struts 28 can be bolted or welded to member 11. It is not essential that a center stud 29 as shown in FIG. 11 be used. As shown in FIG. 18, the bottom of member 11 may be welded to the base of struts 28, which base may be a continuous, integral member extending completely between bolts 43'.

Referring now to FIGS. 7 and 8, there is shown another alternative means for securing the lower vertical tubular member 11b to a vehicle 10b. An upwardly extending coupling 37 is attached to the bed 39 of the vehicle 10b, here a truck, by welding it to bed 39 or through the use of other suitable fastening means, such as welding it to a plate 41 which is affixed to bed 39 by bolts 43, washers 45, and nuts 47. The upwardly extending coupling 37 may be internally threaded to receive compatible threads 49 on the lower vertical tubular member 11b. Alternatively, coupling 37 may instead be unthreaded and telescopically receive the lower vertical tubular member 11b, member 11b being secured in coupling 37 by such means as set screws or pins. Alternatively, the lower vertical tubular member 11b may be secured to the bed of the truck without using a coupling such as shown at 37, by coaxially attaching a threaded stud to the lower vertical tubular member 11b in a manner as shown generally in FIG. 11, inserting the stud through a hole in the bed of the vehicle, and securing it with a lock washer and nut, again as shown in FIG. 11. Struts 28 such as shown in FIG. 18 may be used to attach member 11b to the bed of the truck for additional support.

Referring again to FIG. 1, and additionally to FIGS. 2 and 3, there is shown an additional supporting means which includes a U-shaped, threaded clamp 51. Clamp 51 has a curved portion which has an inside curvature of substantially the same radius as the outside surface of lower tubular member 11. Clamp 51 also has two threaded leg portions 55 which are parallel to each other and extend from the curved portion. Clamp 51 is secured to lower tubular member 11 with a plate 57, and suitble nuts and washers 60. A pair of downwardly extending support plates 61, 63 are retained on leg portions 55 with suitable nuts 65, washers 67, and wing nuts 70, and are designed to sandwich the tailgate 69 between them to provide extra support for tubular member 11. Padding 71 may be provided on the opposing faces of plates 61, 63 to prevent damage to the finish on tailgate 69.

Referring to FIGS. 7 and 9, there is shown an alternative means for providing additional support for the lower vertical tubular member by way of straps 73, 74 on each side, which may be fixed, respectively, to the lower vertical tubular member 11b and to suitable locations along the body of the vehicle 10b by clips 75. A U-shaped clamp 77, similar to clamp 51 but having shorter legs, is affixed to tubular member 11b with plate 79, nuts 81, and suitable washers therebetween. Links 83 are attached to rings 85, which are affixed to one end of straps 73. The other end of each strap 73 is affixed to dual adjustment rings 87. Straps 74 are affixed at one end to rings 89, and the other ends of straps 74 are pulled over, under and through dual rings 87 in the conventional manner until the straps are taut to provide the required support. Rings 89 are attached to clips 75, which are secured in holes 91 in the tops of the side walls of the truck bed.

Referring again to FIG. 1, there is shown a horizontal member 93 which is attached perpendicularly to the upper vertical member 11. The ends of the horizontal member are covered with padding 95 to prevent damage to the load as it is being loaded and transported. Alternatively, as shown in FIG. 6, rollers 97 can be positioned on the horizontal member 93. The rollers may also be padded or of such a composition so as to cushion the load, and are of such a length as to allow the widest portion of the load to remain positioned on the rollers. Rollers 97 are retained on member 93 with collars 99 and set screws 101. Referring to either of FIGS. 1, 4 or 6, eyebolts 103 are shown secured in a pair of holes drilled transversely through the horizontal member 93 and parallel to the axis of the upper vertical member 15. The eyebolts 103 may be secured in any pair of a plurality of pairs of holes drilled through the horizontal member, which allows the device of the present invention to accommodate loads of various widths. The eyebolts are secured with suitable nuts 105 and washers 107 and serve to prevent the load from sliding off the horizontal tubular member, and also serve as means for securing tie down straps 109.

Referring to FIGS. 1 and 5, a rooftop carrier 111 is disposed on the vehicle 10 to support one end of the load, the other end of which is supported on the device of the present invention. Carrier 111 includes rubber suction cups 113, eyebolts 115 extending upwardly therefrom, and horizontal tubular member 117. Padding 119 is disposed on tubular member 117, and eyebolts 115 extend through member 117 and are secured thereto with suitable nuts 121 and washers 123. Rods 125 with hooks 127 on each end may be used to affix the ends of member 117 to the truck body. A plurality of holes 129 are provided in member 117 through which eyebolts 115 may pass, in order to accommodate loads of varying widths. A rope 131 or other suitable tie down means may be affixed to eyebolts 115 to secure the load on member 117.

Referring now to FIG. 10, there is shown the lower vertical tubular member 11a mounted on a trailer hitch 31 attached to vehicle 10a. The load 133 is first shown with one end positioned on the horizontal member 93 so that the load extends perpendicularly to the axis of said horizontal member, and the other end positioned on the ground. Also shown in FIG. 10 is the load 133a after it has been lifted, pivoted, and placed on the rooftop carrier 111. This position of the load is also illustrated in FIG. 1.

Referring now to FIGS. 12-17, one embodiment of a method of loading the load 135 on the vehicle 10c with the invention is depicted. Beginning with FIG. 12, the load's end 137 furthest from the vehicle 10c is lifted and swung in the arc 139 until that end 137 is positioned on the rooftop carrier 111. When an obstacle 141 prevents pivoting the load 135 in the arc 139 all the way to the front of the vehicle, the load may be rolled along the rollers 97 in a direction perpendicular to the axis of the horizontal member 93 as shown in FIGS. 13 and 14. Upon rolling the load sufficiently that end 137 will clear the obstacle 141, end 137 can be swung toward the front of the vehicle so that the other end 143 of the load 135 is pivoted in arc 145, resulting in the configuration of FIG. 15. End 137 may then be rolled back to a position shown in FIG. 16, free of obstacle 141, and rotated in arc 147 to be placed on the rooftop carrier 111 as shown in FIG. 17.

As mentioned previously, the device of the present invention may be used to load and carry two objects simultaneously. Horizontal member 93 must be long enough, of course, to accommodate the width of the two objects which are to be loaded and transported. When using the present invention to load and carry two objects, the first object may be loaded in the manner described in the foregoing paragraph, with the second object then being loaded in the conventional manner requiring two individuals to lift and position the second object adjacent and parallel to the first object. Alternatively, when the objects are light enough to allow it, the two objects may be loaded simultaneously. First, the two objects are positioned adjacent and parallel to one another. One end of each object is positioned on the horizontal member, and the other end of each object remains on the ground behind the vehicle. A rod, board, paddle, or similar rigid lifting means is then placed beneath the two ends of the objects which remain on the ground, and those two ends are lifted simultaneously. The two ends are then carried on the lifting means, rolling the objects back and forth on the rollers if necessary to avoid obstacles, in an arcuate path or paths toward the front of the vehicle. The ends supported by the lifting means are then lowered and placed on the front rooftop carrier, the lifting means is removed, and the objects are secured by appropriate tie down means for transporting.

It will be appreciated that the presence of height adjustment holes 19 in the lower member 11 facilitates the loading and unloading of heavy objects. Prior to placing one end of a heavy object on the horizontal member 93, the upper vertical member 15 is lowered to one of the lowermost positions with pin 17 supporting it. One end of the heavy object is then placed on the horizontal member in such lowered position, thereby avoiding the possibly dangerous or strenuous lifting of a free end of the heavy object to its ultimate transporting height. After placing the other end of the heavy object on the front of the vehicle, the load may be secured with tie down means and the upper vertical member may then be raised to one of its uppermost positions for transporting the heavy object. Lifting the upper vertical member with the heavy load firmly secured to the horizontal member and to the front of the vehicle reduces the risk of injury that might otherwise occur if the heavy object were to be dropped, or if it were to unexpectedly shift positions, while an individual attempts to lift one free end to its ultimate transporting height. The reverse of the foregoing procedure could be followed when unloading the heavy object. The upper vertical member may be lowered, the end of the object at the front of the vehicle lifted and swung around to the back of the vehicle and placed on the ground, and the end of the object on the horizontal member lifted from its lowered position to the ground.

Because many varying and different embodiments may be made within the scope of the inventive concept herein taught, and because many modifications may be made in the embodiment herein detailed, it should be understood that the details described herein are to be interpreted as illustrative and not in a limiting sense.

What is claimed is:

1. A device for loading and transporting elongate objects on a vehicle, said vehicle including means adjacent the front end thereof for supporting one end of said elongate objects, comprising:

a lower hollow tubular member adapted for connection at its lower end in an upright orientation to said vehicle adjacent the rear end thereof;

a first upper member having a lower portion adapted to be rotatably supported within said lower hollow tubular member, said first upper member having an upper end;

a second upper member of elongate configuration mounted at substantially its mid-portion on the upper end of said first upper member and being transversely disposed with respect thereto, said second upper member having an upper bearing surface for supporting the other ends of said elongate objects;

a clamping means for providing support and stability to the upper portion of said lower hollow tubular member, wherein said clamping means comprises a U-shaped clamp disposed on said upper portion of said hollow tubular member, said clamp having a curved portion disposed around and attached to said lower hollow tubular member and threaded leg portions extending perpendicularly to said lower hollow tubular member, and a pair of downwardly extending plates disposed on said threaded leg portions of said U-shaped clamp for receiving the tailgate of said vehicle between said plates.

2. The device of claim 1, wherein said vehicle has a rear bumper, and further comprising a base plate attached to the lower end of said lower hollow tubular member, and a pair of bolts for connecting said base plate to said rear bumper.

3. A device of claim 1, wherein said vehicle has a rear trailer hitch, and said lower hollow tubular member has a downwardly extending threaded stud on its lower end, said threaded stud being received in a correlative hole in said rear trailer hitch and affixed thereto with a washer and nut on the underside of said trailer hitch.

4. The device of claim 1, wherein said vehicle is a pickup truck having a bed and a tailgate, and further comprising a plate affixed to the bed of the truck inside the tailgate, an upstanding female threaded coupling mounted on said plate, and a threaded pin disposed on the lower end of said lower hollow tubular member and threadedly received in said coupling.

5. The device of claim 1, further comprising a plurality of rollers which are received and secured on each side of the mid-portion of said second upper member to allow the elongate objects to be rolled in a direction perpendicular to the longitudinal axis of said second upper member.

6. The device of claim 1, wherein said second upper member is provided with a plurality of transverse holes substantially parallel to the axis of said first upper member and perpendicular to the longitudinal axis of said second upper member, and further comprising a pair of eyebolts, each eyebolt being secured in one of the transverse holes at each end of said second upper member for use in securing the elongate objects to said second upper member.

7. A device for loading and transporting elongate objects on a vehicle, said vehicle including means adjacent the front end thereof for supporting one end of said elongate objects, comprising:

a horizontal member;

a pair of rollers disposed on each end of said horizontal member for allowing the elongate objects to be rolled in a direction perpendicular to the axis of said horizontal member;

an upper vertical member having an upper end and a lower end, wherein said upper end is attached to said horizontal member at substantially the midportion of said horizontal member so that its longitudinal axis is perpendicular to the longitudinal axis of said horizontal member;

a pair of eyebolts disposed in vertically extending holes in said horizontal member near the opposite ends of the horizontal member;

a lower vertical tubular member having an upper end and a lower end, wherein said upper end of said lower tubular member rotatably receives said lower end of said upper vertical member, and wherein said lower end of said lower tubular member is adapted for connection in an upright orientation to said vehicle adjacent to the rear end thereof;

a supporting pin mounted transversely in one pair of a plurality of pairs of opposing holes through said lower vertical tubular member, said pin supporting said upper vertical member;

a U-shaped clamp connected between the upper portion of said lower vertical tubular member and said vehicle for providing support and stability to said upper portion of said lower vertical tubular member, said clamp being attached to said lower vertical tubular member and having elongated threaded legs, said elongated threaded legs having a pair of downwardly extending plates disposed thereon which are clamped to a portion of said vehicle.

8. The device of claim 7, wherein said vehicle has a rear bumper, and further comprising a base plate attached to the lower end of said lower hollow tubular member, and a pair of bolts for connecting said base plate to said rear bumper.

9. The device of claim 7, wherein said vehicle has a rear trailer hitch, and said lower hollow tubular member has a downwardly extending threaded stud on its lower end, said threaded stud being received in a correlative hole in said rear trailer hitch and affixed thereto with a washer and nut on the underside of said trailer hitch.

10. The device of claim 7, wherein said vehicle is a pickup truck having a bed and a tailgate, and further comprising a plate affixed to the bed of the truck inside the tailgate, an upstanding female threaded coupling mounted on said plate, and a threaded pin disposed on the lower end of said lower hollow tubular member and threadedly received in said coupling.

* * * * *